United States Patent Office 3,611,529
Patented Oct. 12, 1971

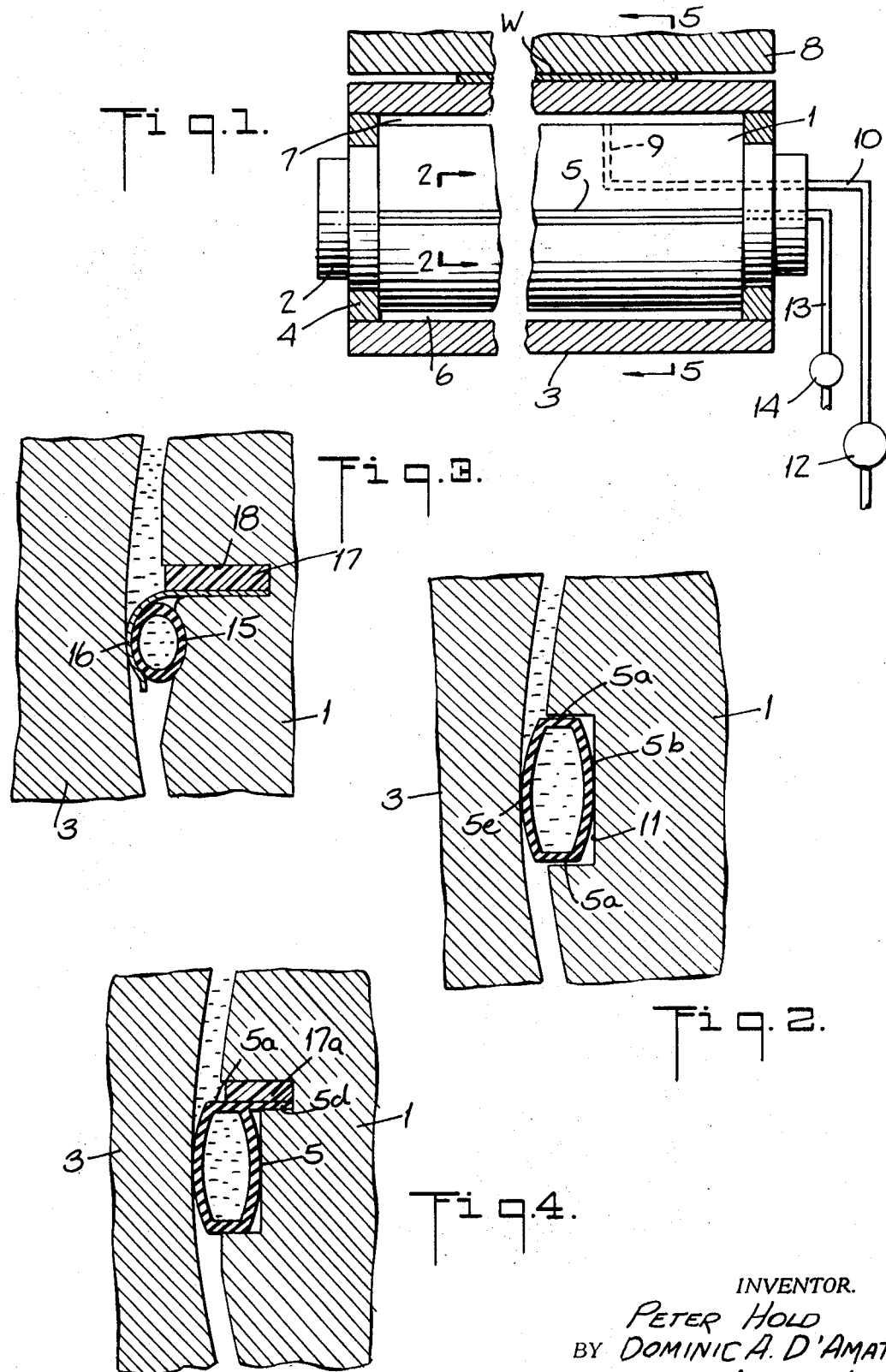

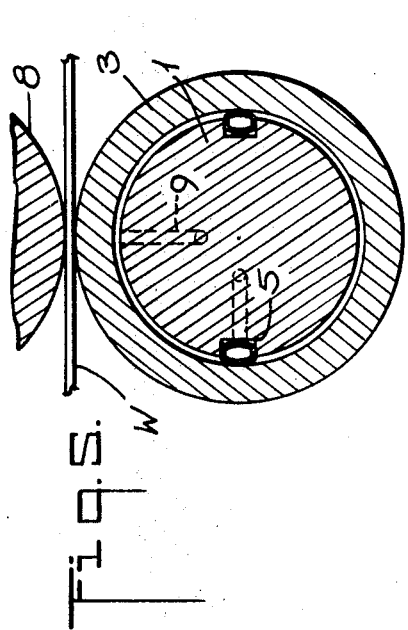
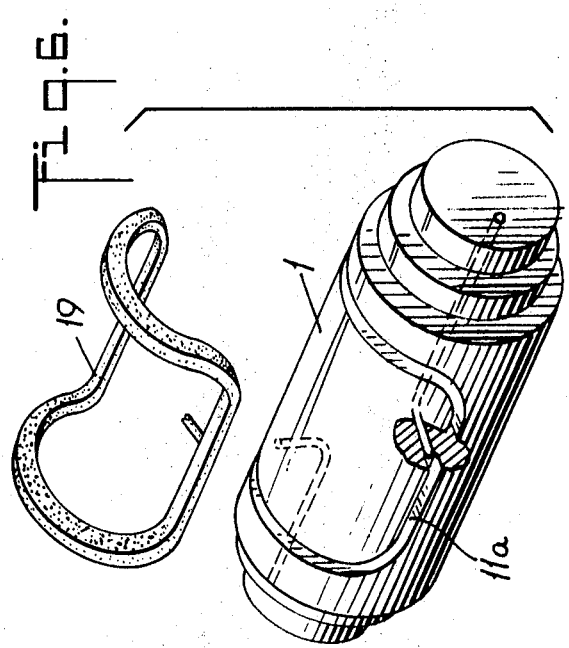
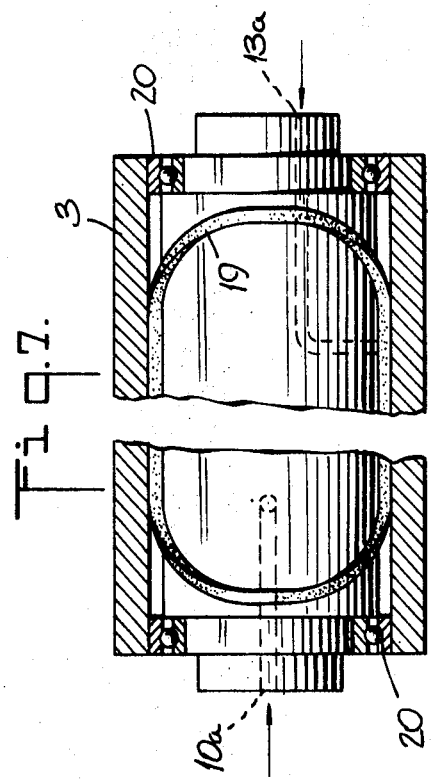
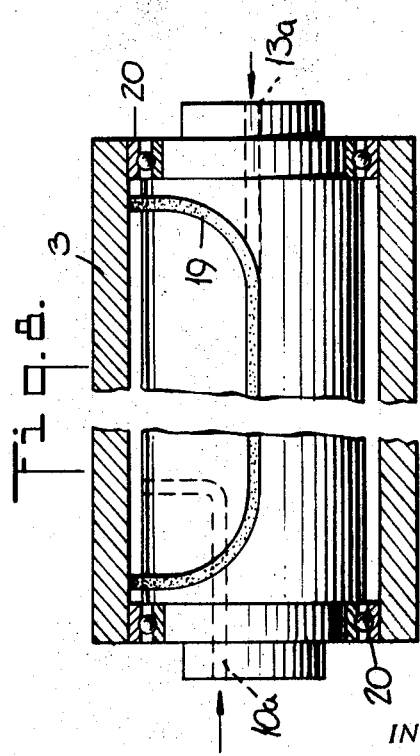
INVENTOR.
PETER HOLD
BY DOMINIC A. D'AMATO
Kenyon & Kenyon
ATTORNEYS

3,611,529
EXPANDABLE SEAL FOR A CONTROLLED DEFLECTION ROLL
Peter Hold, Milford, and Dominic A. D'Amato, Cheshire, Conn., assignors to Farrel Corporation, Ansonia, Conn.
Filed Aug. 28, 1967, Ser. No. 663,595
Int. Cl. B21b *13/00*; F16c *13/00*
U.S. Cl. 29—116                                                    1 Claim

ABSTRACT OF THE DISCLOSURE

A controlled deflection roll has a non-rotative shaft and a superimposed roll shell with space between the two, end and longitudinally extending seals dividing this space into two compartments into one of which liquid is introduced under pressure so that when the roll shell is working against a counter roll under pressure the deflection of the roll shell is controlled by the pressure on the liquid with consequent opposite beam flexure of the shaft. At least the longitudinally extending seals are hollow and inflatable and are expandable by fluid pressure controlled to provide the sealing pressure desired independently of the pressure of the liquid controlling the deflection of the roll shell.

---

This invention relates to controlled deflection rolls of the kind disclosed by the U.S. Appenzeller Pat. 2,908,964 dated Oct. 20, 1959.

Such a roll has a non-rotative shaft with a roll shell superimposed thereabout with a space formed between the inside of the roll shell and the shaft. End and longitudinally extending seals divide this space into two compartments one of which is opposite a counter roll which cooperates with the roll shell to form a nip through which work to be pressure rolled may be passed. The work may consist of a paper or textile web to be calendered, for example.

Ordinarily the pressure of rolling work between a roll and counter roll tends to cause the rolls to flex like beams, or deflect, because their ends are supported by frames or the like which hold the rolls together on the work. Such deflection prevents uniform pressure on the work. But with a controlled deflection roll the introduction of fluid, usually liquid, under pressure into the one of the compartments on the side towards the counter roll controls the deflection of the roll shell to permit uniform pressure on the work.

Heretofore the seals, particularly the longitudinally or axially extending seals, have been designed as packing strips which project from the shaft and bear against the inner wall of the roll shell at an angle so that the sealing pressure against the inside of the roll shell varies with the pressure of the liquid in the compartment controlling the deflection of the roll shell. Even if not so designed the sealing pressure is uncontrollable when the roll is operating.

Rolls of this kind are often long and must exert high rolling pressures requiring high deflection controlling liquid pressures on the liquid confined by the seals. The longitudinally extending or axial seals therefore at times exert a high frictional drag on the rotation of the roll shell relative to the non-rotative shaft on its inside. This is sometimes a disadvantage and the purpose of the present invention is to provide a way to control the sealing pressure of these longitudinal or axial seals independently of the pressure required in the compartment controlling the roll shell deflection. Incidentally, in all events, any longitudinal or axial seals used must accommodate relative deflections of the roll shell and shaft. For instance, there is beam deflection of the non-rotative shaft as the latter provides the necessary reaction to the liquid in the compartment applying the internal pressure to the roll shell to control the latter's deflection.

With the foregoing in mind, the present invention uses inflatable or expandable members for the longitudinal or axial seals and these are supplied by a gas or liquid from a pressure source entirely independent from that providing the fluid under pressure used for controlling the roll shell deflection. These seals are flexible as required to accommodate relative deflection of the roll shell and shaft.

Specific examples of the invention are illustrated more or less schematically by the accompanying drawings in which:

FIG. 1 shows the roll shell and counter roll in longitudinal section with the shaft shown in elevation;
FIG. 2 is a cross-section taken along the line 2—2 in FIG. 1;
FIG. 3 is a modification of FIG. 2;
FIG. 4 shows a further modification of FIG. 2;
FIG. 5 is a cross-section taken along the line 5—5 in FIG. 1;
FIG. 6 is an exploded view of the shaft and seal arrangement of a modification of FIGS. 1 and 5;
FIG. 7 shows the FIG. 6 arrangement in the roll shell with the latter shown in horizontal cross-section; and
FIG. 8 is similar to FIG. 7 excepting that this view is rotated 90° about the axis of the roll assembly.

In FIG. 1, the shaft is shown at 1 with ends 2 so that the shaft can be mounted in frames or the like where by these ends it is positioned non-rotatively. The roll shell 3 is superimposed on this shaft 1 and has a larger inside diameter than the outside diameter of the shaft 1. End seals, schematically shown at 4, prevent endwise leakage of hydraulic liquid from the space formed between the shaft and roll shell, and longitudinal or axial seals 5, located 180° apart, divide this space into a lower compartment 6 and an upper compartment 7.

The lower portion of a counter roll 8 is shown as pressing against work W which passes through the nip formed by this roll 8 and the roll shell 3. Although not shown, this counter roll 8 will of course have roll necks also mounted by frames or the like through rotary bearings and as always there will be means for causing the ends 2 and the unillustrated necks of the roll 8 to be pressed together to apply the pressure to the work W. This results in beam flexure forces being applied to the roll shell 3 and the counter roll 8 but by introducing fluid, usually oil, to the compartment 7 this flexure or deflection of the shell roll 3 is controlled so that uniform pressure is applied to the work. In dotted lines an oil passage 9 is shown so that the oil can be introduced through an inlet 10. Excessive loss of this oil must be prevented by the end seals 4 and the longitudinal or axial seals 5. The end seals 4 do not exert the frictional drag mentioned before to a substantial degree.

The seals 5, and there are two of them, one on each side of the shaft 1, are shown by FIG. 2 to be hollow elements each in the form of a tube which is elongated in cross-section in the circumferential direction of the shaft 1 and having flat ends 5a forming a fit in the ends of a rectangular recess 11 formed in the shaft 1. These seals are inherently flexible by their very nature. The seal in each instance has outwardly convex sides 5b and 5c capable of expanding radially with respect to the shaft 1 and roll shell 3. These seals, which are in effect tubular, may be made of elastically flexible metal, such as a bronze or other alloy with their outer sides adapted to slidingly seal with respect to the roll shell 3, or might be made of an elastically flexible non-metallic material in some instances. In any event, the fluid supplied through the inlet 10, as from a source of controllably variable liquid pressure indicated at 12, has no effect on their sealing pressure. Contrastingly, the sealing pressure is provided by connecting the two tubular seals by way of a conduit 13 with a second source 14 of controllably variable pressure fluid which may be either liquid or air.

With this arrangement, the fluid pressure delivered by the source 12 is varied as required to control the roll shell deflection to give uniform work pressure while the fluid pressure delivered by the source 14 is controlled as required to give the sealing pressure desired.

For example, in some instances it may be desired to have a sealing pressure which almost completely seals the compartment 7 against loss of hydraulic liquid, but in other instances it may very well be desired to have a controlled leakage passing the seals 5 either to reduce the frictional drag of the latter or possibly to obtain a cooling effect on the inside of the roll shell. With the present invention, the operator has complete control of the sealing pressure independently of the hydraulic pressure used to control the deflection of the roll shell.

In FIG. 3 a variation is shown such as might be used in the case of a tubular seal, in this instance numbered 15, which is made of non-metallic material, a metallic rider or bearing sheet 16 being shown superimposed on the tubular element 15 and between it and the inside of the roll shell 3. This rider or bearing sheet is locked in position by a locking bar 17 anchoring an inwardly extending portion of this part 16 in a rather narrow radial slot 18 formed in the shaft 1. Although the latter is shown as slightly indented to receive the inflatable element 15 the rider or bearing sheet 16 also tends to prevent displacement of this inflatable element 15.

In FIG. 4, the same tubular sealing element 5 is shown as to its essential cross-section but in this instance its upper flat surface 5a has an inwardly extending integral strip or flange 5d which is locked in position by a locking bar 17a generally similar to the one shown in the case of FIG. 3.

The relative location of the axial seals is shown in FIG. 5, although anyone familiar with controlled deflection rolls of the kind to which this invention relates should be familiar with the usual 180° arrangement of the longitudinal or axial seals which gives the maximum piston area for the hydraulic liquid controlling the roll shell deflection. If less piston area is preferred the seals are located closer to the roll nip. In this connection, there are many details involved by such controlled deflection rolls which are not illustrated by the drawings or mentioned specifically herein because they would not assist in understanding the principles of the present invention.

As previously indicated, the end seals 4 are shown schematically since they usually do not involve as high a frictional drag as do the longitudinal or axial seals. Because of the flexibility of sealing pressures permitted by the present invention, it does, however, become possible to simplify the construction of the described kind of controlled deflection roll by combining the side and end seals as shown by FIG. 6. Here the shaft 1 has a recess such as the recess 11, shown here at 11a, which not only runs for substantially the full length of the shaft 1, and of course the roll shell, but at the shaft's ends loops around the half circumference of the shaft 1 so as to form a continuous recess. The inflatable seal 19 is likewise formed as an endless unit which fits in this recess 11a.

The assembly is shown by FIGS. 7 and 8 with the hydraulic fluid for controlling the roll shell deflection being introduced via the inlet 10a and the fluid for inflating the seal 19 introduced via the inlet 13a. In this instance self-aligning bearings 20 are shown as locating the roll shell 3 relative to the ends of the shaft 1 in a positive manner. Rolls of this kind are provided with such bearings both to hold the roll shell against lateral motion relative to the counter roll and to provide fulcrums permitting deliberate bending of the roll shell 3 with the latter's portion between the bearings then providing the uniform work pressure.

Here again the source of variable hydraulic pressure supplied through the inlet 10a to control the deflection of the roll shell, is entirely separate from the fluid pressure introduced through the inlet 13a to control the variable sealing pressure.

It can be seen from the foregoing that whereas in the prior art there was no way to control the sealing pressure independently from the pressure of the hydraulic liquid used to control the deflection of the roll shell, that now it is possible to vary the sealing pressure independently. Therefore, assuming the hydraulic liquid used for roll deflection control is oil, as it usually is, this oil may be permitted to leak at a controlled rate, depending on the fluid pressure applied to the inflatable seal, so as to lessen the frictional drag to rotation of the roll shell, and this particularly applies to the longitudinal or axial extending seals, or to provide greater sealing pressure if desired.

Incidentally, although not shown, since the sealing is effected by the flexible side of the inflatable or expandable element facing the inside of the roll shell, it is possible to substitute only a wall or a sliding piston confining the sealing pressure hydraulic liquid or fluid in the longitudinally extending recesses of the shaft, and through this single wall seal the longitudinal extending spaces as required. This may be applicable to the end seals also.

What is claimed is:

1. A controlled deflection roll including a non-rotative shaft, a roll shell superimposed thereon with space therebetween and end and axially extending seals connected to said shaft and dividing said space into two compartments into one of which fluid is introduced under pressure from a source of fluid pressure to control the deflection of said roll shell when it receives deflection force and resulting in opposite deflection of said shaft; wherein the improvement comprises at least said axially extending seals having fluid expandable or inflatable elements for applying the sealing pressure, and a source of fluid under pressure for inflating said means controllably during roll operation and which is independent with respect to said source introducing fluid to said space, said side and end seals being formed by a continuous length of a tubular element which loops circumferentially partially around each end of said shaft to form said end seals and axially along this shaft to form said axially extending seals.

References Cited

UNITED STATES PATENTS

| | | | |
|---|---|---|---|
| 1,744,048 | 1/1930 | Knight | 308—9 X |
| 2,908,964 | 10/1959 | Appenzeller | 308—9 UX |
| 3,146,160 | 8/1964 | Kankaanpaa | 29—116 A.P. |
| 3,240,038 | 3/1966 | Schwegler | 277—34 UX |

LEON G. MACHLIN, Primary Examiner

UNITED STATES PATENT OFFICE
CERTIFICATE OF CORRECTION

Patent No. 3,611,529        Dated October 12, 1971

Inventor(s) Peter Hold and Dominic A. D'Amato

It is certified that error appears in the above-identified patent and that said Letters Patent are hereby corrected as shown below:

Column 1, line 5, change "Farrel Corporation, Ansonia, Connecticut" to --USM Corporation, Boston, Massachusetts--.
Signed and sealed this 4th day of April 1972.

(SEAL)
Attest:

EDWARD M. FLETCHER, JR.
Attesting Officer

ROBERT GOTTSCHALK
Commissioner of Patents